Feb. 7, 1967  D. A. PAICE ETAL  3,303,416
VOLTAGE REGULATORS
Filed Jan. 29, 1963
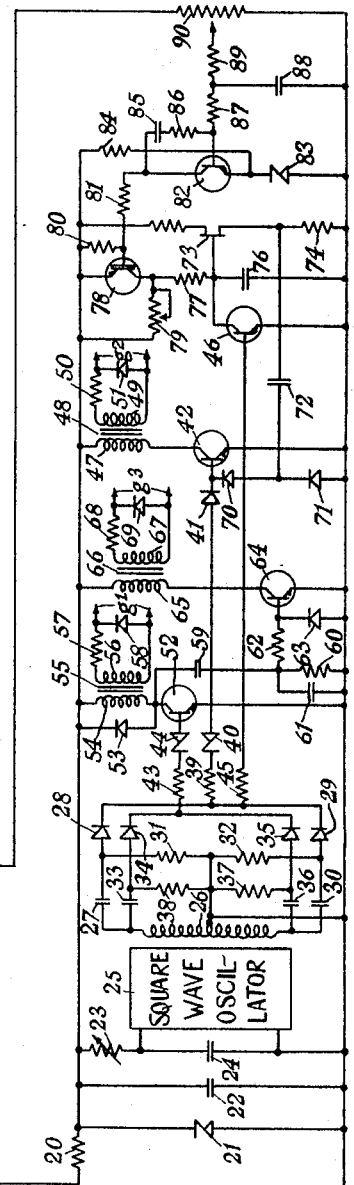
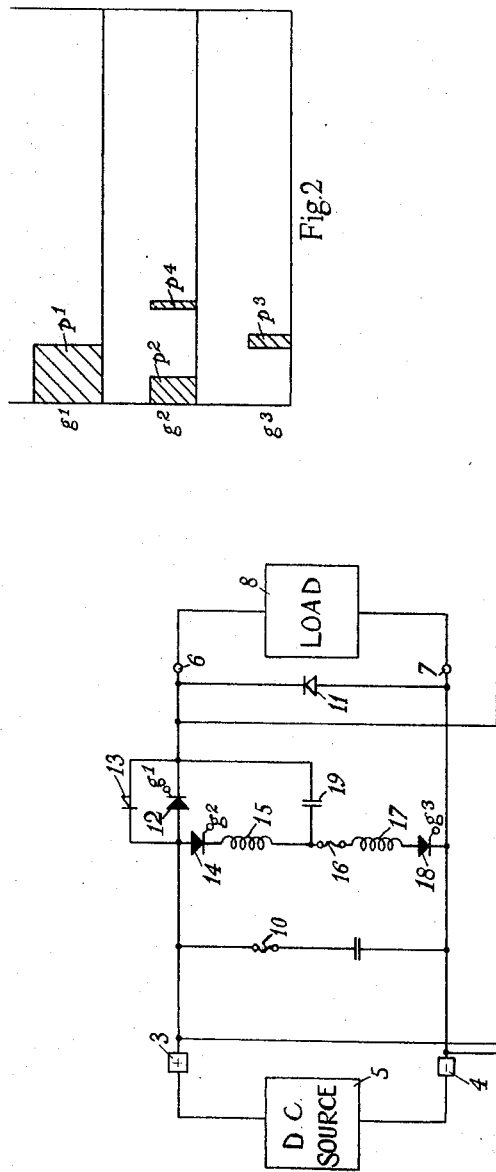

United States Patent Office 3,303,416
Patented Feb. 7, 1967

3,303,416
VOLTAGE REGULATORS
Derek Albert Paice and Walter Sinclair, Hemel Hempstead, England, assignors to Rotax Limited, London, England
Filed Jan. 29, 1963, Ser. No. 254,802
Claims priority, application Great Britain, Feb. 6, 1962, 4,464/62
3 Claims. (Cl. 323—18)

This invention relates to voltage regulators of the kind in which a D.C. supply circuit is broken intermittently for periods sufficient to maintain the average voltage at a desired value.

A voltage regulator according to the invention comprises in combination first and second terminals for connection to a D.C. supply to be regulated, third and fourth terminals for connection to a load, the second and fourth terminals being interconnected, a controlled rectifier through the anode and cathode of which the first and third terminals are interconnected, a capacitor in circuit with the controlled rectifier, means for applying pulses to the controlled rectifier to render it conductive at pedetermined equal intervals, first switch means operable at a variable time between successive pulses to cause discharge of the capacitor to switch off the controlled rectifier, and second switch means operable between the receipt of a pulse and the operation of the first switch means, the second switch means serving to ensure that the capacitor is charged to the correct polarity to cause switching off of the controlled rectifier when the first switch means is operated, and the time at which the first switch means operates being determined by the voltage across the third and fourth terminals, so that this voltage is maintained substantially constant.

In the accompanying drawings, FIGURE 1 is a circuit diagram illustrating one example of the invention, and FIGURE 2 illustrates the pulses applied to the controlled rectifiers.

Referring first to FIGURE 1, there are provided first and second terminals 3, 4 connected to a D.C. source 5 so as to be of relatively positive and negative polarity in use respectively. The terminal 3 is connected to a terminal 6 through the anode and cathode of a controlled rectifier 12, whlist the terminal 4 is connected to a terminal 7. Between the terminal 6, 7 is connected a load 8 in parallel with a diode 11.

The terminals 3, 4 are interconnected through a series circuit including the anode and cathode of a second controlled rectifier 14, a first inductor 15, a fuse 16, a second inductor 17 and the anode and cathode of a third controlled rectifier 18. Moreover a point intermediate the inductor 15 and fuse 16 is connected to the cathode of the controlled rectifier 12 through a capacitor 19, and the anode and cathode of the first controlled rectifier are interconnected through a diode 13. The terminals 3, 4 are further connected through a capacitor 19 having a fuse 10 in series therewith.

Connected in parallel across the terminals 3, 4 is a resistor 20 in series with a Zener diode 21. Moreover, connected in parallel across the Zener diode 21 are two circuits one of which contains a capacitor 22, and the other of which contains a variable resistor 23 in series with a capacitor 24. A square wave oscillator 25 is connected across the capacitor 24. This oscillator may be of any convenient known form and is indicated diagrammatically. However, the output winding of the oscillator is shown at 26.

The ends of the winding 26 are interconnected by a first circuit including in series a capacitor 27, a diode 28, a diode 29 and a capacitor 30. The anodes of the diodes 28, 29 are interconnected through resistors 31, 32 in series, and the mid-point of the winding 26 is connected to the terminal 4 and to a point intermediate the resistors 31, 32. The second circuit connecting the ends of the winding 26 includes a capacitor 33, diode 34, diode 35 and capacitor 36, the anodes of the diodes 34, 35 being interconnected through resistors 38, 37 in series, a point intermediate these resistors being connected to the mid-point of the winding 26.

The cathodes of the diodes 28, 29 are connected through a resistor 39, Zener diode 40, and diode 41 in series to the base of a transistor 42 having its emitter connected to the terminal 4. The collector of the transistor 42 is connected to the terminal 3 through the primary winding 47 of a transformer 48, the secondary winding 49 of which has its ends interconnected through a resistor 50 and diode 51 in series. The output from across the diode 51 is applied between the gate and cathode of the controlled rectifier 14. The cathodes of the diodes 34, 35 are interconnected through a resistor 43 and Zener diode 44 in series to the base of a transistor 52 having its emitter connected to the terminal 4. The collector of the transistor 52 is connected to the terminal 3 through the primary winding 54 of a transformer 55, the secondary winding 56 of which is bridged by a resistor 57 in series with a diode 58. The output from across the diode 58 is applied between the gate and cathode of the controlled rectifier 12. The winding 54 is bridged by a diode 53.

The collector of the transistor 52 is further connected through a capacitor 59 and a resistor 60 in series to the terminal 4, the resistor 60 being bridged by parallel circuits one of which contains a capacitor 61, and the other of which contains a resistor 62 in series with a diode 63. A point intermediate the resistor 62 and diode 63 is connected to the base of a transistor 64, the emitter of which is connected to the terminal 4 and the collector of which is connected to the terminal 3 through the primary winding 65 of a transformer 66. The secondary winding 67 of the transformer 66 is bridged by a resistor 68 in series with a diode 69, and the output from across the diode 69 is applied between the gate and cathode of the controlled rectifier 18.

The cathodes of the diodes 28, 29 are further connected through a resistor 45 to the base of the transistor 46 the emitter of which is connected to the terminal 4. The collector of the transistor 46 is connected to the emitter of a uni-junction transistor 73, the secondary base terminal of which is connected through a resistor 74 to the terminal 4, and through a capacitor 72 to a point intermediate a pair of diodes 70, 71 connected between the base of the transistor 42 and the terminal 4. The emitter of the transistor 73 is further connected through a capacitor 76 to the terminal 4, and through a resistor 77 to the collector of a transistor 78. The transistor 78 has its emitter connected to the terminal 3, its collector connected to the terminal 3 through a variable resistor 79, and its base connected to the terminal 3 through a resistor 80, and through a resistor 81 to the collector of a transistor 82. The transistor 82 has its emitter connected to the terminal 4 through a Zener diode 83, and to the terminal 3 through a resistor 84, its collector connected to its base through a capacitor 85 in series with a resistor 86, and its base connected through resistors 87, 89 in series to a variable point on a resistor 90 connected between the terminals 6, 7. A point intermediate the resistors 87, 89 is connected to the terminal 4 through the capacitor 88.

The lower half of the circuit shown in FIGURE 1 operates to produce four control pulses during each cycle of operation of the oscillator 25. These pulses are indicated at P1, P2, P3 and P4 in FIGURE 2. At the commencement of a cycle, the transistors 52 and 42 are rendered conductive to produce the pulses P1, P2 respectively. However, the time constant of the circuits are such that the width of the pulse P1 is greater than the width of the pulse P2. When the transistor 52 ceases to conduct, the transistor 64 is momentarily rendered conductive to produce the pulse P3, and the arrangement is such that, as indicated in FIGURE 2, the commencement of the pulse P3 coincides with the termination of the pulse P1.

The pulse P4 is variable, and is not produced by the oscillator 25. The arrangement is such that at the commencement of each cycle of operation of the oscillator, the transistor 82 is rendered conductive by an amount dependent on the voltage across the resistor 90. Conduction of the transistor 82 serves in turn to control conduction of the transistor 78, which controls the rate of charge of the capacitor 76. When the capacitor 76 has charged to a predetermined value, the uni-junction transistor 73 becomes conductive, and serves through the diode 70 to apply a pulse to the transistor 42 to switch the latter on and produce the pulse P4. It will thus be appreciated that the point at which the pulse P4 occurs is dependent upon the output voltage. At the end of each cycle, the oscillator 25 renders the transistor 46 conductive to discharge the capacitor 76.

The pulses P1 applied to the controlled rectifier 12 switch it on at the commencement of each cycle. However, the pulses P2 have no effect if, as is normally the case, the capacitor 19 is charged positively (i.e., its plate connected to the cathode of the controlled rectifier 12 is negatively charged).

The pulse P3 allows one half of an oscillatory current to flow through the inductor 17 and the controlled rectifiers 18, 12. At the end of this half-cycle, the controlled rectifier 18 is reverse biased and therefore cut off. The capacitor 19 is now charged negatively to level which is excess of the supply voltage by virtue of the positive charge on the capacitor when the controlled rectifier 18 is fired.

At a variable point after the reversal of charge on the capacitor, the controlled rectified 14 is fired by the pulse P4, with the result that one half of an oscillatory current flows through the diode 13, the controlled rectifier 14 and the inductor 15. This circuit diverts the current from the controlled rectifier 12, which is simultaneously reverse biased by the voltage drop across the diode 13, and is therefore cut off. Any back E.M.F. resulting from inductance in the load is conducted through the diode 11.

The controlled rectifier 12 now remains non-conductive for the remainder of the cycle. It will be understood that the variations in the instant in each cycle at which the controlled rectifier 14 is caused to conduct can serve to maintain the mean output voltage substantially constant.

With the arrangement described, the capacitor 19 will be positively charged at the commencement of each cycle. In these circumstances, the pulse applied to the controlled rectifier 14 at the commencement of each cycle is not necessary. However, it is preferable to apply this pulse, for the following reason. Whilst the capacitor 19 is continuously being charged and discharged, the voltage available for effecting switching off of the controlled rectifier 12 is considerably in excess of the supply voltage; it may, for example, be three times the supply voltage. If the pulse is not applied to the controlled rectifier 14 and moreover no further pulse is applied to the controlled rectifier 14 during a cycle (i.e., under conditions of maximum output, when the pulse P4 does not appear) the charge on the capacitor 19 will be reduced by leakage to approximately the supply voltage so that the controlled rectifier 12 may not be effectively switched off when required. Under maximum output conditions, the capacitor 19 is charged negatively at the commencement of a cycle. The firing of the second controlled rectifier at the beginning of a cycle now prevents conduction of the controlled rectifier 12, but the supply to the load 8 is maintained by discharge of the capacitor 19. As soon as the capacitor 19 has discharged, the controlled rectifier 12 is able to conduct and the cycle continues as before. It will be appreciated that with this system of control, the maximum output is slightly in excess of the D.C. supply voltage minus the normal forward voltage drop of controlled rectifier 12.

It will be understood that the third and second controlled rectifiers 18, 14 constitute first and second switch means which could be replaced by other switch means operated at the required instants in each cycle. Moreover, the control means for producing the pulses in the example described may take a variety of other forms.

Having thus described our invention what we claim as new and desire to secure by Letters Patent is:

1. A voltage regulator comprising in combination first and second terminals for connection to a D.C. supply to be regulated, third and fourth terminals for connection to a load, the second and fourth terminals being interconnected, a first controlled rectifier through the anode and cathode of which the first and third terminals are interconnected, a capacitor connected at one side to the cathode of the first controlled rectifier, a first inductor connected in series with a second controlled rectifier between the other side of the capacitor and the anode of the controlled rectifier, a second inductor connected in series with a third controlled rectifier between said other side of the capacitor and and the second terminal, a diode having its anode and cathode connected respectively to the cathode and anode of the first controlled rectifier, and a control circuit connected to the gates of the controlled rectifiers, the control circuit including first pulse-producing means for switching the first controlled rectifier on at predetermined equal intervals of time, second pulse-producing means operable at fixed intervals after switching on of the first controlled rectifier for switching the third controlled rectifier on, switching on of the third controlled rectifier resulting in charging of the capacitor until the third controlled rectifier is automatically switched off by the back bias across it, third pulse-producing means for switching on the second controlled rectifier at a variable instant after switching on of the third controlled rectifier, and fourth pulse-producing means for switching on the second controlled rectifier at the same time as the first controlled rectifier is rendered conductive, switching on of the second controlled rectifier permitting discharge of the capacitor through the diode and consequential switching off of the first controlled rectifier, said variable instant being determined by the voltage across the third and fourth terminals so that the mean voltage across the third and fourth terminals is maintained substantially constant, and said first, second and fourth pulse-producing means being constituted by a square wave oscillator and associated delay and shaping circuits.

2. A voltage regulator as claimed in claim 1 in which the third pulse-producing means comprises a uni-junction transistor which when conductive switches on the second controlled rectifier, a second capacitor for controlling conduction of the uni-junction transistor, means operable by the voltage across the third and fourth terminals for controlling charging of the second capacitor, and means operable by the oscillator for discharging the second capacitor immediately before the first controlled rectifier is rendered conductive.

3. A voltage regulator comprising in combination a D.C. source, a load, means coupling said D.C. source to said load and including the anode-cathode path of a controlled rectifier, means for applying pulses to said controlled rectifier at predetermined equal intervals to render it conductive, a capacitor in circuit with said controlled rectifier, first switch means coupling said capacitor to said D.C. source and serving when conductive to reverse the voltage across said capacitor, means for rendering said first switch means conductive each time said control rectifier is rendered conductive, second switch means coupling said capacitor to said D.C. source and serving when conductive to apply the capacitor voltage across said controlled rectifier to turn said controlled rectifier off, means sensitive to the voltage across said load for rendering said second switch means conductive to turn said controlled rectifier off whereby to regulate the voltage applied to said load, and means for rendering said second switch means conductive at the same time as said controlled rectifier is rendered conductive, whereby to ensure that said capacitor is fully charged when said second switch means is rendered conductive.

References Cited by the Examiner

UNITED STATES PATENTS 3,213,287  10/1965  King _____ 307—71

OTHER REFERENCES

Menard and Carl: "Time Ratio Switch for Voltage Regulator," IBM Technical Disclosure Bulletin, vol. 2, No. 8, January 1964.

JOHN F. COUCH, *Primary Examiner.*

K. D. MOORE, *Assistant Examiner.*